(12) United States Patent
Patil et al.

(10) Patent No.: US 12,032,593 B2
(45) Date of Patent: Jul. 9, 2024

(54) REAL-TIME DATA REPLICATION MONITORING AND MANAGEMENT

(71) Applicant: Bank of America Corporation, Charlotte, NC (US)

(72) Inventors: Sachin Vilas Patil, West Windsor, NJ (US); Saalim Moideen, Hoboken, NJ (US)

(73) Assignee: Bank of America Corporation, Charlotte, NC (US)

( * ) Notice: Subject to any disclaimer, the term of this patent is extended or adjusted under 35 U.S.C. 154(b) by 4 days.

(21) Appl. No.: 18/057,659

(22) Filed: Nov. 21, 2022

(65) Prior Publication Data

US 2024/0168971 A1 May 23, 2024

(51) Int. Cl.
*G06F 17/00* (2019.01)
*G06F 16/27* (2019.01)

(52) U.S. Cl.
CPC .................................... *G06F 16/27* (2019.01)

(58) Field of Classification Search
CPC ........................................................ G06F 16/27
See application file for complete search history.

(56) References Cited

U.S. PATENT DOCUMENTS

| 6,625,623 | B1 | 9/2003 | Midgley et al. |
| 7,490,111 | B2 * | 2/2009 | Shen ................... H04L 67/1095 |
| 7,565,661 | B2 | 7/2009 | Sim-Tang |
| 8,073,777 | B2 | 12/2011 | Barry et al. |
| 8,103,691 | B2 | 1/2012 | Chunilal |
| 8,103,906 | B1 | 1/2012 | Alibakhsh et al. |
| 8,775,591 | B2 | 7/2014 | Bobak et al. |
| 9,578,088 | B2 | 2/2017 | Nickolov et al. |
| 9,734,169 | B2 | 8/2017 | Redlich et al. |
| 9,734,221 | B2 | 8/2017 | Sarferaz |
| 9,734,230 | B2 | 8/2017 | Sarferaz |
| 10,235,439 | B2 | 3/2019 | Sullivan et al. |
| 10,671,628 | B2 | 6/2020 | Sullivan et al. |
| 10,810,229 | B2 | 10/2020 | O'Shaughnessy |
| 2006/0171523 | A1 * | 8/2006 | Greenwell ............... H04L 67/01 455/414.1 |
| 2007/0185939 | A1 * | 8/2007 | Prahland ............. G06F 16/1734 |
| 2009/0313311 | A1 * | 12/2009 | Hoffmann ........... G06F 11/2097 |
| 2016/0328432 | A1 | 11/2016 | Raghunathan |
| 2020/0242129 | A1 | 7/2020 | Botev et al. |
| 2021/0089210 | A1 * | 3/2021 | Seguy ................... H04L 41/142 |

* cited by examiner

*Primary Examiner* — Greta L Robinson

(57) ABSTRACT

A system and method for monitoring and managing a real-time data replication process. The method includes generating a validation key, sending a first copy of the validation key to a primary data storage (PDS) system and a second copy of the validation key to a secondary data storage (SDS) system, and determining if the SDS system stores a third copy of the validation key received from the PDS system via a data replication system. The method further includes determining a replication lag time of the data replication system, and, in response to determining that the replication lag time is less than or equal to a replication lag time threshold value, determining a status of application data stored in the SDS system as not stale.

20 Claims, 5 Drawing Sheets

REAL-TIME DATA REPLICATION MONITORING AND MANAGEMENT

TECHNICAL FIELD

The present disclosure relates generally to a data replication process, and more specifically to a system and method for monitoring and managing a real-time data replication process.

BACKGROUND

Organizations often maintain copies of data in multiple data stores for various reasons, e.g., for faster data access, resiliency, scalability, and load partitioning. Data synchronization between primary data stores and secondary data stores may be performed by real-time data replication systems and/or applications. Using the real-time data replication may cause following problems: (a) possibility of having stale data in secondary data stores if the real-time data replication process is down or experiencing replication lag; and (b) applications and/or application systems, which access data from the secondary data stores do not have knowledge if the secondary data stores have stale or current data.

SUMMARY

The system described in the present disclosure provides several practical applications and technical advantages that overcome the current technical problems as described herein. The following disclosure is particularly integrated into practical applications of: (a) monitoring and managing a real-time data replication process to determine if data stored in a secondary data storage system is stale or not; and (b) automatically switching from the secondary data storage system to a primary data storage system based on a data status of the secondary data storage system. Accordingly, an application and/or an application system that is configured to access the secondary data storage system, receives the current data even if the secondary data storage system stores stale data.

These practical applications may achieve the following technical advantages: (a) improving data synchronization between multiple storage systems of a distributed storage system by monitoring and managing the real-time data replication process; and (b) providing an efficient data access for application systems by automatically switching between primary and secondary data storage systems, and thus, improving data access times and reducing a network bandwidth required by the application systems for data access.

The disclosed system is configured to determine a data status of a secondary data storage system. A data management system inserts a validation key into both a primary data storage system and a secondary data storage system. Subsequently the data management system determines if the secondary data storage system stores a copy of the validation key that was received from the primary data storage system via a real-time data replication system. If such a copy of the validation key is present and a replication lag time is less than or equal to a replication lag time threshold, the data management system determines an application data stored by the secondary data storage as not stale. If such a copy of the validation key is not present or a replication lag time is greater than the replication lag time threshold, the data management system determines the application data stored by the secondary data storage as stale. This process is performed in a loop, and respective status check data is stored in the secondary data storage system. The status check data may be used to provide a most recent or current application data to an application system. The application system may request a status for the application data stored in the secondary data storage system from the data management system. In response to determining that the application data stored in the secondary data storage is not stale, the application system retrieves desired data from the secondary data storage system. In response to determining that the application data stored in the secondary data storage is stale, the application system retrieves the desired data from the primary data storage system. Accordingly, the application system receives the current data even if the secondary data storage system stores stale data.

In one embodiment, an apparatus includes a primary data storage (PDS) system, a secondary data storage (SDS) system, a data replication system communicatively coupling the PDS system to the SDS system, and a data management system communicatively coupled to the PDS system and the SDS system. The data replication system is configured to replicate application data stored by the PDS system in the SDS system. The data management system includes a processor configured to: (a) generate a validation key comprising a unique key and a first time stamp; (b) send a first copy of the validation key to the PDS system; (c) send a second copy of the validation key to the SDS system; (d) determine if the SDS system stores a third copy of the validation key, where the third copy of the validation key is received from the PDS system via the data replication system; (e) in response to determining that the SDS system stores the third copy of the validation key, determine a second time stamp associated with the third copy of the validation key, where the second time stamp corresponds to a time when the third copy of the validation key is received from the data replication system; (f) determine a replication lag time of the data replication system based on the first time stamp and the second time stamp; (g) compare the replication lag time to a replication lag time threshold value; and (h) in response to determining that the replication lag time is less than or equal to the replication lag time threshold value, determine a status of the replicated application data stored in the SDS system as not stale.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to provide a system and method for monitoring and managing real-time data replication processes between various data storage systems. Embodiments of the present disclosure and its advantages may be understood by referring to FIGS. 1 through 5. FIGS. 1 through 4 are used to describe a system and method for monitoring and managing a real-time data replication process between a primary data storage system and a secondary data storage system. FIGS. 1, 2, 3 and 5 are used to describe a system and method for retrieving current application data from a secondary data storage system and/or a primary data storage system based on a data status of the secondary data storage system.

System Overview

Figure 1:
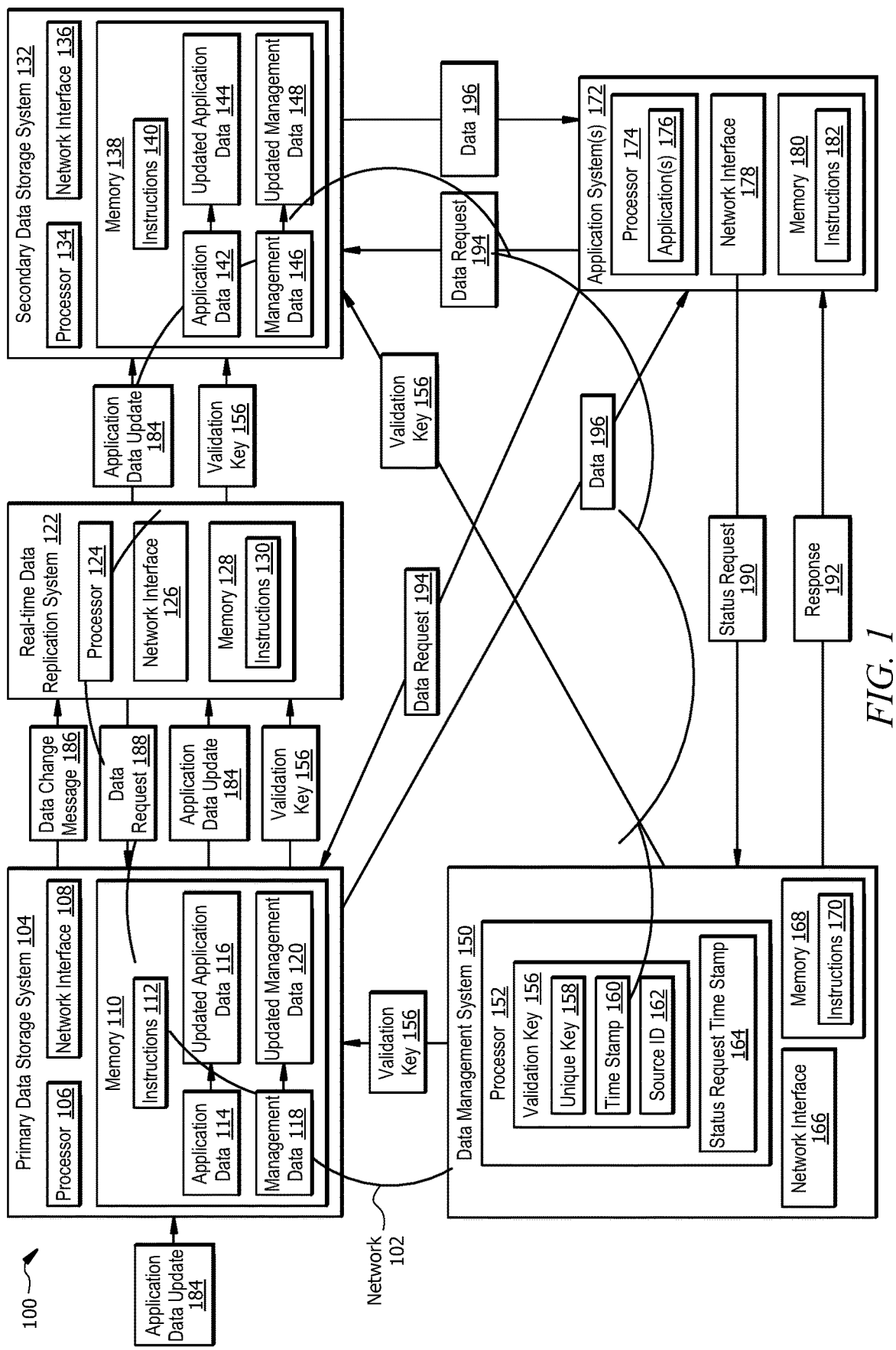
FIG. 1 illustrates an embodiment of a system configured to a manage real-time data replication process between a primary data storage system and a secondary data storage system.

FIG. 1 illustrates an embodiment of a system 100 that is generally configured to monitor and manage a real-time data replication process between a primary data storage system and a secondary data storage system. In general, a data management system 150 of system 100 inserts a validation key 156 into both a primary data storage system 104 and a secondary data storage system 132. Subsequently the data management system 150 determines if the secondary data storage system 132 stores a copy of the validation key 156 that was received from the primary data storage 104 system via a real-time data replication system 122. If such a copy of the validation key 156 is present and a replication lag time is less than or equal to a replication lag time threshold, the data management system 150 determines an application data 144 stored by the secondary data storage 132 as not stale. If such a copy of the validation key 156 is not present or the replication lag time is greater than the replication lag time threshold, the data management system 150 determines the application data 144 stored by the secondary data storage 132 as stale. This process is performed in a loop, and respective status check data is stored in the secondary data storage system 132. The status check data may be used to provide a most recent or current application data to an application system 172. The application system 172 may request a status for the application data 144 stored in the secondary data storage system 132 from the data management system 150. In response to determining that the application data 144 stored in the secondary data storage system 132 is not stale, the application system 172 retrieves desired data from the secondary data storage system 132. In response to determining that the application data 144 stored in the secondary data storage system 132 is stale, the application system retrieves the desired data from the primary data storage system 104.

In certain embodiments, the system 100 comprises a primary data storage (PDS) system 104, a real-time data replication (RDR) system 122, a secondary data storage (SDS) system 132, a data management (DM) system 150, and one or more application systems 172 that are operably coupled to each other via a network 102. Network 102 enables the communication between the components of the system 100. In other embodiments, the system 100 may not have all the components listed and/or may have other elements instead of, or in addition to, those listed above. For example, the data management system 150 and/or the RDR system 122 may be integrated into the SDS system 132.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

Primary Data Storage System

The PDS system 104 is generally any device that is configured to store and process data and communicate with other components of the system 100 via the network 102. The PDS system 104 may comprise a processor 106 in signal communication with a memory 110 and a network interface 108.

Processor 106 comprises one or more processors operably coupled to the memory 110. The processor 106 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 106 may be a programmable logic device, a microcontroller, a microprocessor, or any suitable combination of the preceding. The one or more processors are configured to process data and may be implemented in hardware or software. For example, the processor 106 may be 8-bit, 16-bit, 32-bit, 64-bit, or of any other suitable architecture. The one or more processors are configured to implement various software instructions to perform the operations described herein.

Network interface 108 is configured to enable wired and/or wireless communications (e.g., via network 102). The network interface 108 is configured to communicate data between the PDS system 104 and other components of the system 100. For example, the network interface 108 may comprise a WIFI interface, a local area network (LAN) interface, a wide area network (WAN) interface, a modem, a switch, or a router. The processor 106 is configured to send and receive data using the network interface 108. The network interface 108 may be configured to use any suitable type of communication protocol as would be appreciated by one of ordinary skill in the art.

Memory 110 may be volatile or non-volatile and may comprise a read-only memory (ROM), random-access memory (RAM), ternary content-addressable memory (TCAM), dynamic random-access memory (DRAM), and static random-access memory (SRAM). Memory 110 may be implemented using one or more disks, tape drives, solid-state drives, and/or the like. The memory 110 is operable to store software instructions 112, and/or any other data and instructions. The software instructions 112 may comprise any suitable set of software instructions, logic, rules, or code operable to be executed by the processor 106 to implement the function(s) described herein.

In certain embodiments, the memory 110 further stores application data 114 that may be accessible to the one or more application systems 172. The PDS system 104 may be configured to receive application data update 184 and generate updated application data 116 from the application data 114.

In certain embodiments, the memory 110 further stores management data 118 that is generated by the DM system 150. The PDS system 104 may be configured to receive new management data (e.g., validation key 156) from the DM system 150 and generate updated management data 120 from the management data 118. The validation key 156 may comprise a unique key 158, a time stamp 160, and a source identifier 162.

Figure 2:
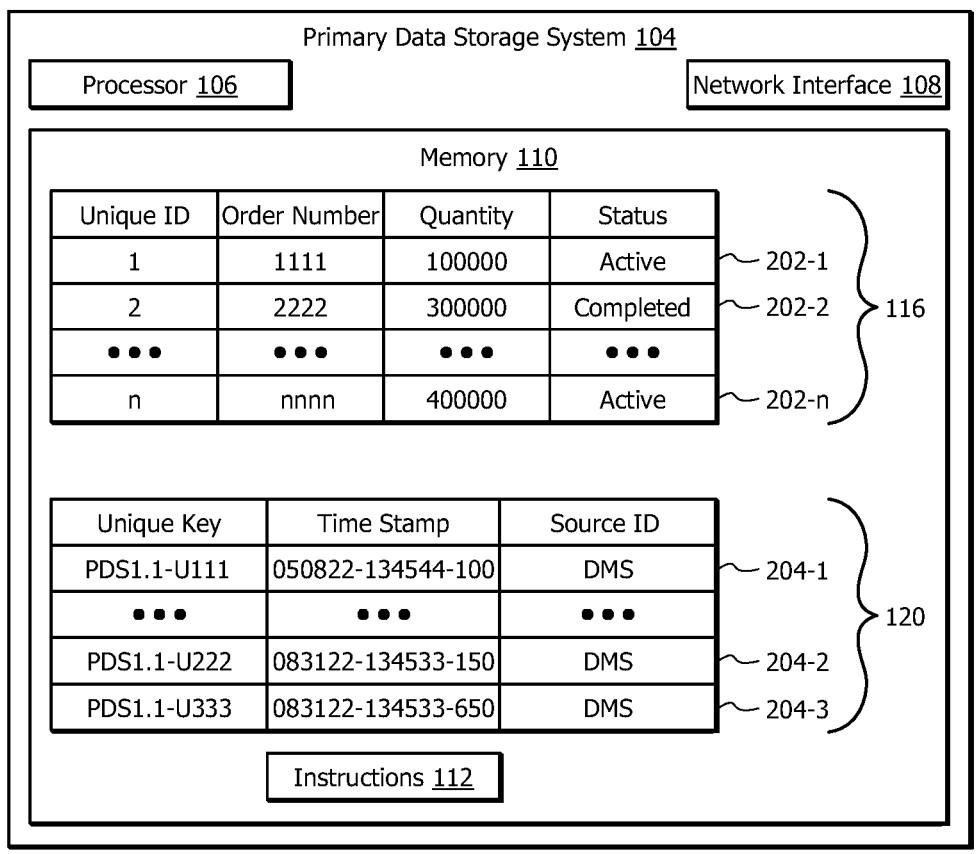
FIG. 2 illustrates an embodiment of a primary data storage system.

FIG. 2 illustrates an embodiment of the primary data storage system 104. In certain embodiments, the updated application data 116 may comprise a table having a plurality of rows (e.g., rows 202-1 through 202-n), with each row corresponding to a respective order. Each row may comprise a unique identifier of a respective order, an order number of the respective order, a quantity of the respective order, and/or a status of the respective order. In other embodiments, the updated application data 116 may comprise any application data that is suitable for the one or more application systems 172.

In certain embodiments, the updated management data 116 may comprise a table having a plurality of rows (e.g., rows 204-1, 204-2, and 204-3), with each row corresponding to a respective validation key. Each validation key comprises a unique key, a time stamp, and a source identifier. The unique key uniquely identifies the validation key and may comprise any alphanumeric characters. The time stamp may encode the date and time when the validation key is inserted in the PDS system 104. The time stamp may have a format of MMDDYY-hhmmss-mSmSmS, wherein "MM" indicates a month, "DD" indicates a day, "YY" indicates a year, "hh" indicates an hour, "mm" indicates minutes, "ss" indicates seconds, and "mS" indicates milliseconds. The source identifier identifies a source for the validation keys. In the illustrated embodiment, the validation keys are received from the DM system 150 and the source identifier indicates "DMS."

Real-Time Data Replication System

The RDR system 122 is generally any device that is configured to process data and communicate with other components of the system 100 via the network 102. The RDR system 122 may comprise a processor 124 in signal communication with a memory 128 and a network interface 126.

Processor 124 comprises one or more processors operably coupled to the memory 128. The processor 124 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 124 may be a programmable logic device, a microcontroller, a microprocessor, or any suitable combination of the preceding. The one or more processors are configured to process data and may be implemented in hardware or software. For example, the processor 124 may be 8-bit, 16-bit, 32-bit, 64-bit, or of any other suitable architecture. The one or more processors are configured to implement various software instructions to perform the operations described herein.

Network interface 126 is configured to enable wired and/or wireless communications (e.g., via network 102). The network interface 126 is configured to communicate data between the RDR system 122 and other components of the system 100. For example, the network interface 126 may comprise a WIFI interface, a local area network (LAN) interface, a wide area network (WAN) interface, a modem, a switch, or a router. The processor 124 is configured to send and receive data using the network interface 126. The network interface 126 may be configured to use any suitable type of communication protocol as would be appreciated by one of ordinary skill in the art.

Memory 128 may be volatile or non-volatile and may comprise a read-only memory (ROM), random-access memory (RAM), ternary content-addressable memory (TCAM), dynamic random-access memory (DRAM), and static random-access memory (SRAM). Memory 128 may be implemented using one or more disks, tape drives, solid-state drives, and/or the like. The memory 128 is operable to store software instructions 130, and/or any other data and instructions. The software instructions 130 may comprise any suitable set of software instructions, logic, rules, or code operable to be executed by the processor 124 to implement the function(s) described herein.

The RDR system 122 may be configured to replicate data between the PDS system 104 and the SDS system 132. In certain embodiments, the RDR system 122 may receive a data change message 186 from the PDS system 104 in response to receiving the application data update 184. In response to receiving the data change message 186, the RDR system 122 may send a data request 188 to the PDS system 104 and receive the application data update 184 from the PDS system 104. In certain embodiments, the RDR system 122 may also receive the validation key 156 from the PDS system 104. The RDR system 122 may be further configured to communicate the application data update 184 and the validation key 156 to the SDS system 132.

Secondary Data Storage System

The SDS system 132 is generally any device that is configured to store and process data and communicate with other components of the system 100 via the network 102. The SDS system 132 may comprise a processor 134 in signal communication with a memory 138 and a network interface 136.

Processor 134 comprises one or more processors operably coupled to the memory 138. The processor 134 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 134 may be a programmable logic device, a microcontroller, a microprocessor, or any suitable combination of the preceding. The one or more processors are configured to process data and may be implemented in hardware or software. For example, the processor 134 may be 8-bit, 16-bit, 32-bit, 64-bit, or of any other suitable architecture. The one or more processors are configured to implement various software instructions to perform the operations described herein.

Network interface 136 is configured to enable wired and/or wireless communications (e.g., via network 102). The network interface 136 is configured to communicate data between the SDS system 132 and other components of the system 100. For example, the network interface 136 may comprise a WIFI interface, a local area network (LAN) interface, a wide area network (WAN) interface, a modem, a switch, or a router. The processor 134 is configured to send and receive data using the network interface 136. The network interface 136 may be configured to use any suitable type of communication protocol as would be appreciated by one of ordinary skill in the art.

Memory 138 may be volatile or non-volatile and may comprise a read-only memory (ROM), random-access memory (RAM), ternary content-addressable memory (TCAM), dynamic random-access memory (DRAM), and static random-access memory (SRAM). Memory 138 may be implemented using one or more disks, tape drives, solid-state drives, and/or the like. The memory 138 is operable to store software instructions 140, and/or any other data and instructions. The software instructions 140 may comprise any suitable set of software instructions, logic, rules, or code operable to be executed by the processor 134 to implement the function(s) described herein.

In certain embodiments, the memory 138 further stores application data 142 that may be accessible to the one or more application systems 172. The SDS system 132 may be configured to receive the application data update 184 from the RDR system 122 and generate updated application data 144 from the application data 142. In embodiments when the RDR system 122 operates properly, the application data 142 is a copy or a replica of the application data 114 that is stored in the PDS system 104, and the updated application data 144 is a copy or a replica of the updated application data 116 that is stored in the PDS system 104.

In certain embodiments, the memory 138 further stores management data 146 that is generated by the DM system 150. The SDS system 132 may be configured to receive two copies of the validation key 156, one directly from the DM system 150 and another indirectly from the DM system 150 via the PDS system 104 and the RDR system 122. The DM system 150 and/or the SDS system 132 uses these two copies of the validation key 156 to generate updated management data 148 from the management data 146.

Figure 3:
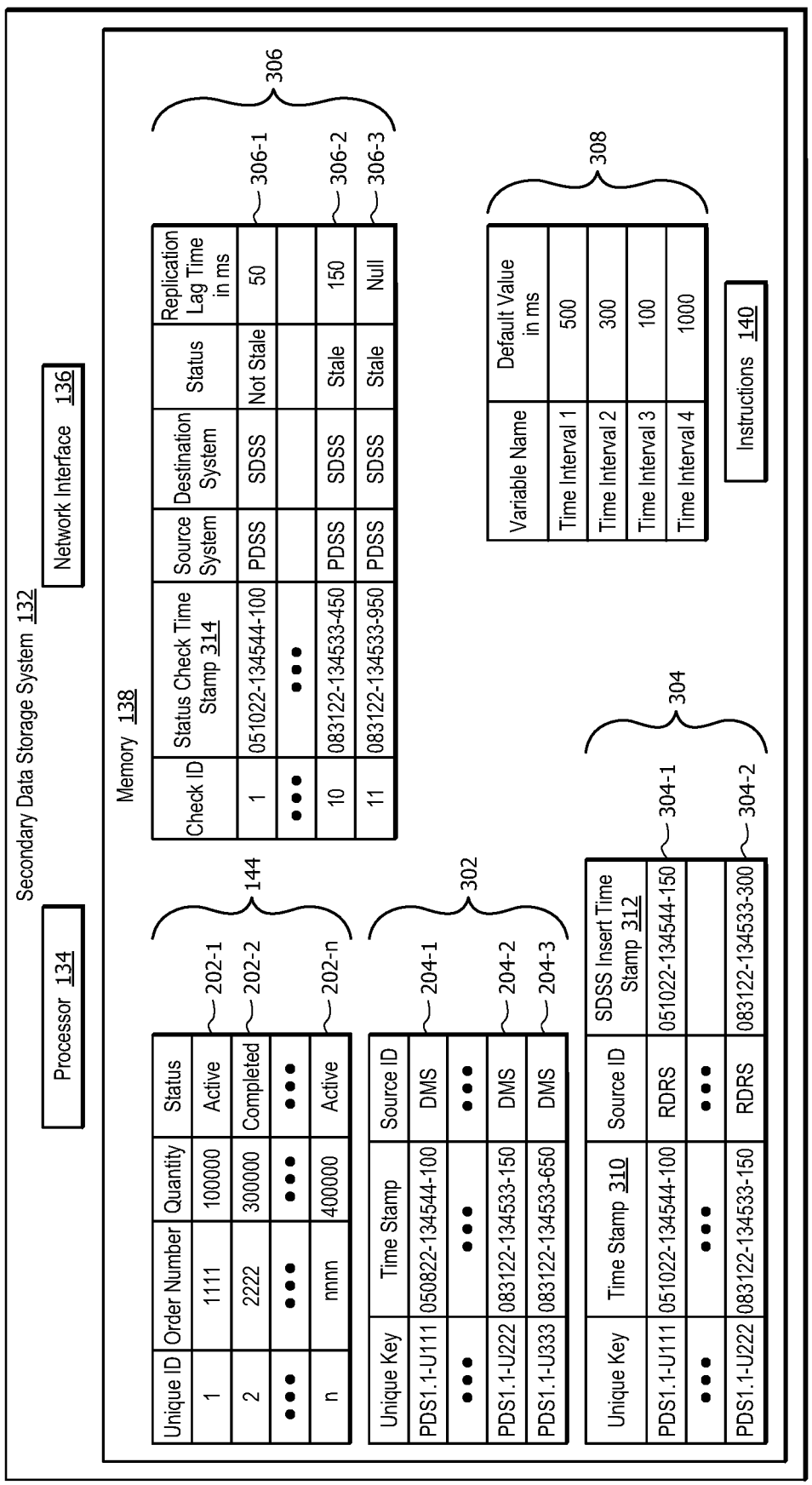
FIG. 3 illustrates an embodiment of a secondary data storage system.

FIG. 3 illustrates an embodiment of the secondary data storage system 132. In certain embodiments, the updated application data 144 may comprise a table having a plurality of rows (e.g., rows 202-1 through 202-n), with each row corresponding to a respective order. Each row may comprise a unique identifier of a respective order, an order number of the respective order, a quantity of the respective order, and/or a status of the respective order. In other embodiments, the updated application data 144 may comprise any application data that is suitable for the one or more application systems 172.

In embodiments when the RDR system 122 operates properly, the updated application data 144 is a copy or a replica of the updated application data 116 that is stored in the PDS system 104. In embodiments when the RDR system 122 does not operate properly, the updated application data 144 is different from the updated application data 116 that is stored in the PDS system 104. For example, the updated application data 144 and the updated application data 116 may comprise tables having different number rows.

In certain embodiments, the updated management data 148 may comprise a plurality of tables (e.g., tables 302, 304, 306, and 308). The table 302 may be also referred to as a validation key table. The table 302 may have a plurality of rows (e.g., rows 204-1, 204-2, and 204-3), with each row corresponding to a respective validation key. Each validation key comprises a unique key, a time stamp, and a source identifier. The unique key uniquely identifies the validation key and may comprise any alphanumeric characters. The time stamp may encode the date and time when the validation key is inserted in the SDS system 132. The time stamp may have a format of MMDDYY-hhmmss-mSmSmS, wherein "MM" indicates a month, "DD" indicates a day, "YY" indicates a year, "hh" indicates an hour, "mm" indicates minutes, "ss" indicates seconds, and "mS" indicates milliseconds. The source identifier identifies a source for the validation keys. In the illustrated embodiment, the validation keys are received from the DM system 150 and the source identifier indicates "DMS." In certain embodiments, the table 302 is a copy or a replica of the updated management data 120 of the PDS system 104.

The table 304 may be also referred to as a replicated validation key table. The table 304 may have a plurality of rows (e.g., rows 304-1 and 304-2), with each row corresponding to a respective replicated validation key. Each replicated validation key is inserted in the SDS system 132 by the RDR system 122 and corresponds to a copy of a respective validation key that was inserted in the PDS system 104 by the DM system 150.

Each replicated validation key comprises a unique key, a first time stamp 310, a second time stamp 312, and a source identifier. The unique key uniquely identifies the validation key and may comprise any alphanumeric characters. The first time 310 stamp may encode the date and time when the validation key is inserted in the PDS system 104 or the SDS system 132. The second time stamp 312 may encode the date and time when the replicated validation key is inserted in the SDS system 132. The first time stamp 310 and the second time stamp 312 may have a format of MMDDYY-hhmmss-mSmSmS, wherein "MM" indicates a month, "DD" indicates a day, "YY" indicates a year, "hh" indicates an hour, "mm" indicates minutes, "ss" indicates seconds, and "mS" indicates milliseconds. The source identifier identifies a source for replicated validation keys. In the illustrated embodiment, the replicated validation keys are received from the RDR system 122 and the source identifier indicates "RDRS."

In embodiments when the RDR system 122 operates properly, the rows of the table 304 correspond to respective rows of the table 302. In such embodiments, the tables 302 and 304 have same number of rows. For example, the row 304-1 corresponds to the row 204-1, and the row 304-1 corresponds to the row 204-1. Correspondence between the rows is established by shared unique key. In embodiments when the RDR system 122 does not operates properly, the tables 302 and 304 have different number of rows. For example, the table 304 does not have a row that corresponds to the row 204-3 of the table 302. This may indicate that either the RDR system 122 has failed to replicate the validation key of the row 204-3 or a replication lag time is too long.

The table 306 is generated by the DM system 150 and the table 308 comprises various variable that are used by the DM system 150 when generating the table 306. The tables 306 and 308 will be described in greater detail below when describing the DM system 150.

Data Management System

Data management (DM) system 150 is generally any device that is configured to process data and communicate with other components of the system 100 via the network 102. DM system 150 may comprise a processor 152 in signal communication with a memory 168 and a network interface 166.

Processor 152 comprises one or more processors operably coupled to the memory 168. The processor 152 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 152 may be a programmable logic device, a microcontroller, a microprocessor, or any suitable combination of the preceding. The one or more processors are configured to process data and may be implemented in hardware or software. For example, the processor 152 may be 8-bit, 16-bit, 32-bit, 64-bit, or of any other suitable architecture. The one or more processors are configured to implement various software instructions to perform the operations described herein.

Network interface 166 is configured to enable wired and/or wireless communications (e.g., via network 102). The network interface 166 is configured to communicate data between the DM system 150 and other components of the system 100. For example, the network interface 166 may comprise a WIFI interface, a local area network (LAN) interface, a wide area network (WAN) interface, a modem, a switch, or a router. The processor 152 is configured to send and receive data using the network interface 166. The network interface 166 may be configured to use any suitable type of communication protocol as would be appreciated by one of ordinary skill in the art.

Memory 168 may be volatile or non-volatile and may comprise a read-only memory (ROM), random-access memory (RAM), ternary content-addressable memory (TCAM), dynamic random-access memory (DRAM), and static random-access memory (SRAM). Memory 168 may be implemented using one or more disks, tape drives, solid-state drives, and/or the like. The memory 168 is operable to store software instructions 170, and/or any other data and instructions. The software instructions 170 may comprise any suitable set of software instructions, logic, rules, or code operable to be executed by the processor 152 to implement the function(s) described herein.

In certain embodiments, the DM system 150 is configured to monitor and manage a data replication process performed by the RDR system 122. The DM system 150 is configured to insert a validation key (e.g., validation key 156) in the PDS system 104 and the SDS system 132. In certain embodiments, the validation key is inserted in the PDS system 104 and the SDS system 132 at the same time. This insertion process may be repeated multiple times, such that consecutive insertion processes are separated in time by Time Interval 1, that may be stored in the table 308 of the SDS system 132 (see FIG. 3). In an embodiment, the value for Time Interval 1 is 500 ms. In other embodiments, the value for Time Interval 1 may be chosen according to design requirement for the DM system 150. The multiple insertion processes generate the tables 120 and 302 in the PDS system 104 and the SDS system 132, respectively. In the illustrated embodiments, a validation key having a unique key PDS1.1-U333 is consecutive to a validation key having a unique key PDS1.1-U222.

After each insertion process, the DM system 150 is configured to wait for Time Interval 2 before performing a status check process. A value for Time Interval 2 may be stored in the table 308 of the SDS system 132 (see FIG. 3). In an embodiment, the value for Time Interval 2 is 300 ms. In other embodiments, the value for the Time Interval 2 may be chosen according to design requirement for the DM system 150. The status check process may comprise searching the table 304 to identify if a validation key that was inserted in the PDS system 104 by the DM system 150 was replicated by the RDR system 122 into the SDS system 132.

In certain embodiments, the DM system 150 may identify if a unique key in the table 302 matches a unique key in the table 304. In response to determining that a unique key in the table 302 matches a unique key in the table 304, the DM system 150 determines a replication lag time by calculating a difference between the time stamp 312 and the time stamp 310. The replication lag time is compared to a replication lag time threshold that is stored in the table 308 as Time Interval 3 (see FIG. 3). In an embodiment, the value of Time Interval 3 is 100 ms. In other embodiments, the value for Time Interval 3 may be chosen according to design requirement for the DM system 150. In response to determining that the replication lag time is less than or equal to the replication lag time threshold, the DM system 150 determines the status of application data stored in the SDS system 132 as not stale. In response to determining that the replication lag time is greater than the replication lag time threshold, the DM system 150 determines the status of application data stored in the SDS system 132 as stale. In response to determining that a unique key in the table 302 does not match a unique key in the table 304, the DM system 150 is unable to determine a replication lag time and determines the status of application data stored in the SDS system 132 as stale.

Each status check process is recorded in a table 306 that is stored in the SDS system 132 (see FIG. 3). The table 306 may comprise a plurality of rows (e.g., rows 306-1, 306-2, and 306-3), with each row corresponding to a respective status check process. Each row comprises a status check identifier, a status check time stamp, a source system, a destination system, a replication lag time, and a data status. The status check identifier uniquely identifies the status check process and may comprise any alphanumeric characters. The status check time stamp may encode the date and time when the status check was performed. The status check time stamp may have a format of MMDDYY-hhmmss-mSmSmS, wherein "MM" indicates a month, "DD" indicates a day, "YY" indicates a year, "hh" indicates an hour, "mm" indicates minutes, "ss" indicates seconds, and "mS" indicates milliseconds. The source system is identified as "PDSS," and the destination system is identified as "SDS S." The data status may be unidentified as "Stale" or "Not Stale."

For example, the status check with status check id 1 determines that the validation key having the unique key PDS1.1-U111 was replicated by the RDR system 112 with the replication lag time of 50 ms (which is less than the replication lag time threshold of 100 ms) and identifies the data status as "Not Stale." The status check with status check id 10 determines that the validation key having the unique key PDS1.1-U222 was replicated by the RDR system 112 with the replication lag time of 150 ms (which is greater than the replication lag time threshold of 100 ms) and identifies the data status as "Stale." The status check with status check id 11 determines that the validation key having the unique key PDS1.1-U333 was not replicated by the RDR system 112, identifies the replication lag time as "null," and identifies the data status as "Stale."

The status check table 306 may be used by the DM system 150 to provide data status of the SDS system 132 to one or more application systems 172 that are configured to access application data stored in the SDS system 132. In certain embodiments, the DM system 150 is configured to receive a status request (e.g., status request 190) from the one or more application systems 172. The DM system 150 identifies a latest status check from the table. The DM system 150 determines a time difference between the status request and the latest status check and compares the time difference with a threshold value that is stored in Time Interval 4 of table 308 (see FIG. 3). In an embodiment, the value of Time Interval 4 is 1000 ms. In other embodiments, the value for Time Interval 4 may be chosen according to design requirement for the DM system 150. In response to determining that the time difference between the status request and the latest status check is greater than the threshold value, the DM system 150 provides a response (e.g., response 192) to the one or more application systems 172 that the DM system 150 has failed, and the data status cannot be determined. The one or more application systems 172 send a request (e.g., data request 194) to the PDS system 104 and retrieve a desired data (e.g., data 196) from the PDS system 104 instead of the SDS system 132. In response to determining that the time difference between the status request and the latest status check is less than or equal to the threshold value, the DM system 150 provides a response to the one or more application system, with the response comprising a data status for the latest status check. In an embodiment when the response identifies the data status as "Stale," the one or more application systems 172 send a request (e.g., data request 194) to the PDS system 104 and retrieve a desired data (e.g., data 196) from the PDS system 104 instead of the SDS system 132. In an embodiment when the response identifies the data status as "Not Stale," the one or more application systems 172 send a request (e.g., data request 194) to the SDS system 132 and retrieves a desired data (e.g., data 196) from the SDS system 132.

Application Systems

Each application system 172 is generally any device that is configured to process data and communicate with other components of the system 100 via the network 102. Each application system 172 may comprise a processor 172 in signal communication with a memory 180 and a network interface 178.

Processor 174 comprises one or more processors operably coupled to the memory 180. The processor 174 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 174 may be a programmable logic device, a microcontroller, a microprocessor, or any suitable combination of the preceding. The one or more processors are configured to process data and may be implemented in hardware or software. For example, the processor 174 may be 8-bit, 16-bit, 32-bit, 64-bit, or of any other suitable architecture. The one or more processors are configured to implement various software instructions to perform the operations described herein.

Network interface 178 is configured to enable wired and/or wireless communications (e.g., via network 102). The network interface 178 is configured to communicate data between the application system 172 and other components of the system 100. For example, the network interface 178 may comprise a WIFI interface, a local area network (LAN) interface, a wide area network (WAN) interface, a modem, a switch, or a router. The processor 174 is configured to send and receive data using the network interface 178. The network interface 178 may be configured to use any suitable type of communication protocol as would be appreciated by one of ordinary skill in the art.

Memory 180 may be volatile or non-volatile and may comprise a read-only memory (ROM), random-access memory (RAM), ternary content-addressable memory (TCAM), dynamic random-access memory (DRAM), and static random-access memory (SRAM). Memory 180 may be implemented using one or more disks, tape drives, solid-state drives, and/or the like. The memory 180 is operable to store software instructions 182, and/or any other data and instructions. The software instructions 182 may comprise any suitable set of software instructions, logic, rules, or code operable to be executed by the processor 174 to implement the function(s) described herein. For example, the software instructions 182 are operable to be executed by the processor 174 to implement one or more applications 176.

Example Method for Monitoring and Managing a Real-Time Data Replication Process

Figure 4:
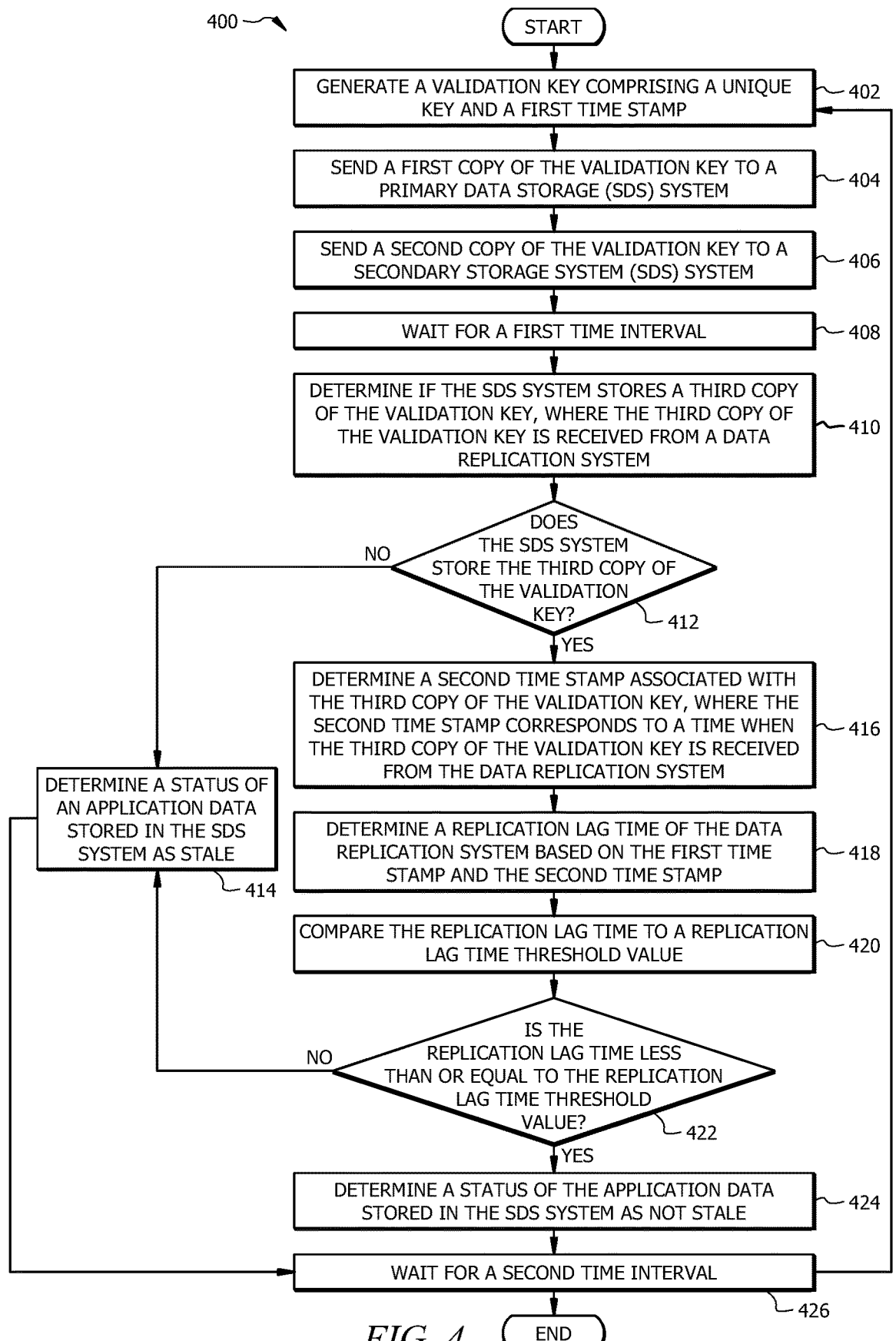
FIG. 4 illustrates an example operational flow of system of FIG. 1 for monitoring and managing a real-time data replication process between a primary data storage system and a secondary data storage system.

FIG. 4 illustrates an example flowchart of a method 400 for monitoring and managing a real-time data replication process. Modifications, additions, or omissions may be made to method 400. Method 400 may include more, fewer, or other operations. For example, operations may be performed in parallel or in any suitable order. For example, one or more operations of method 400 may be implemented, at least in part, in the form of software instructions (e.g., instructions 112, 130, 140, 170, and/or 182 of FIG. 1), stored on non-transitory, tangible, machine-readable medium (e.g., memories 110, 128, 138, 168, and/or 180 of FIG. 1) that, when executed by one or more processors (e.g., processors 106, 124, 134, 152, and/or 174 of FIG. 1), may cause the one or more processors to perform operations 402-426. In certain embodiments, the operations 402-426 may be performed in a loop.

At operation 402, a data management system (e.g., DM system 150 of FIG. 1) generates a validation key (e.g., validation key 156 of FIG. 1), such that the validation key comprises a unique key (e.g., unique key 158 of FIG. 1) and a first time stamp (e.g., time stamp 160 of FIG. 1).

At operation 404, the DM system sends a first copy of the validation key to a primary data storage system (e.g., PDS system 104 of FIG. 1). In certain embodiments, the first copy of the validation key may be stored in a table (e.g., table 120 of FIG. 2).

At operation 406, the DM system sends a second copy of the validation key to a secondary data storage system (e.g., SDS system 132 of FIG. 1). In certain embodiments, the second copy of the validation key may be stored in a table (e.g., table 302 of FIG. 3).

At operation 408, the DM system waits for a first time interval.

At operation 410, the DM system determines if the SDS system stores a third copy of the validation key, where the third copy of the validation key is received from a data replication system (e.g., RDR system 122 of FIG. 1). In certain embodiments, the third copy of the validation key may be stored in a table (e.g., table 304 of FIG. 3).

At operation 412, in response to determining that the SDS system does not store the third copy of the validation key, method 400 continues to operations 414 and 426.

At operation 414, the DM system determines a status of an application data stored in the SDS system as stale.

At operation 426, the DM system waits for a second time interval.

Further at operation 412, in response to determining that the SDS system stores the third copy of the validation key, method 400 continues to operations 416-426.

At operation 416, the DM system determines a second time stamp (e.g., time stamp 312 of FIG. 3) associated with the third copy of the validation key, where the second time stamp corresponds to a time when the third copy of the validation key is received from the RDR system.

At operation 418, the DM system determines a replication lag time of the RDR system based on the first time stamp and the second time stamp.

At operation 420, the DM system compares the replication lag time to a replication lag time threshold value.

At operation 422, in response to determining that the replication lag time is greater than the replication lag time threshold value, method 400 continues to operations 414 and 426.

At operation 414, the DM system determines a status of an application data stored in the SDS system as stale.

At operation 426, the DM system waits for a second time interval.

Further at operation 422, in response to determining that the replication lag time is less than or equal to the replication lag time threshold value, method 400 continues to operations 424 and 426.

At operation 424, the DM system determines a status of the application data stored in the SDS system as not stale.

At operation 426, the DM system waits for a second time interval.

The method 400 is integrated into a practical application of monitoring and managing a real-time data replication process to determine if data stored in the secondary data storage system is stale or not.

Example Method for Retrieving an Application Data

Figure 5:
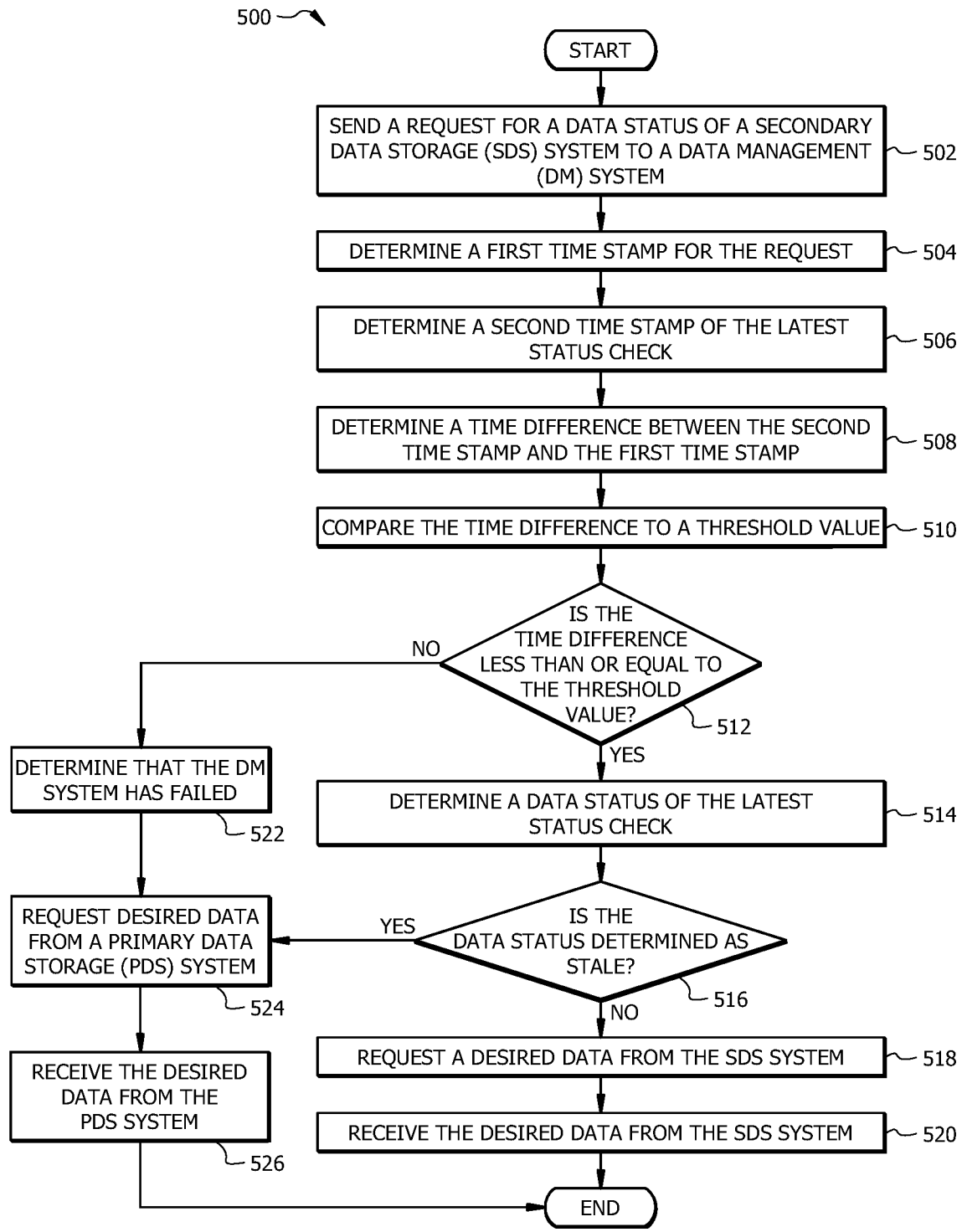
FIG. 5 illustrates an example operational flow of system of FIG. 1 for retrieving current application data from a secondary data storage system and/or a primary data storage system based on a data status of the secondary data storage system.

FIG. 5 illustrates an example flowchart of a method 500 for retrieving current application data from a secondary data storage system and/or a primary data storage system based on a data status of the secondary data storage system. Modifications, additions, or omissions may be made to method 500. Method 500 may include more, fewer, or other operations. For example, operations may be performed in parallel or in any suitable order. For example, one or more operations of method 500 may be implemented, at least in part, in the form of software instructions (e.g., instructions 112, 130, 140, 170, and/or 182 of FIG. 1), stored on non-transitory, tangible, machine-readable medium (e.g., memories 110, 128, 138, 168, and/or 180 of FIG. 1) that, when executed by one or more processors (e.g., processors 106, 124, 134, 152, and/or 174 of FIG. 1), may cause the one or more processors to perform operations 502-520.

At operation 502, an application system (e.g., application system 172 of FIG. 1) sends a request (e.g., status request 190 of FIG. 1) for a data status of a secondary data storage system (e.g., SDS system 132 of FIG. 1) to a data management system (e.g., DM system 150 of FIG. 1).

At operation 504, the DM system determines a first time stamp (e.g., status request time stamp 164 of FIG. 1) for the request.

At operation 506, the DM system determines a second time stamp (e.g., status check time stamp 314 of FIG. 3) of the latest status check. In certain embodiments, the latest status check may be determined from a table (e.g., table 306 of FIG. 3) stored in the SDS system.

At operation 508, the DM system determines a time difference between the first time stamp and the second time stamp.

At operation 510, the DM system compares the time difference to a threshold value.

At operation 512, in response to determining that the time difference is greater than the threshold value, method 500 continues to operations 522, 524, and 526.

At operation 522, the DM system determines that the DM system has failed and provides a response (e.g., response 192 of FIG. 1) to the application system that the data status cannot be determined.

At operation 524, in response to receiving the response, the application system requests desired data (e.g., data 196 of FIG. 1) from a primary data storage system (e.g., PDS system 104 of FIG. 1).

At operation 526, the application system receives the desired data from the PDS system.

Further at operation 512, in response to determining that the time difference is less than or equal to the threshold value, method 500 continues to operations 514, 516, 518, and 520.

At operation 514, the DM system determines a data status of the latest status check and provides the data status to the application system as a response.

At operation 516, in response to determining that the data status is stale, method 500 continues to operations 524 and 526.

At operation 524, the application system requests the desired data from the PDS system 104.

At operation 526, the application system receives the desired data from the PDS system.

Further at operation 516, in response to determining that the data status is not stale, method 500 continues to operations 518 and 520.

At operation 518, the application system requests desired data (e.g., data 196 of FIG. 1) from the SDS system.

At operation 520, the application system receives the desired data from the SDS system.

The method 500 is integrated into a practical application of switching between a primary data storage system and a secondary data storage system based on a data status of the secondary data storage system, such that an application system that is configured to access the secondary data storage system, receives the current data even if the secondary data storage system stores stale data.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus comprising:
   a primary data storage (PDS) system;
   a secondary data storage (SDS) system;
   a data replication system communicatively coupling the PDS system to the SDS system, wherein the data replication system is configured to replicate application data stored by the PDS system in the SDS system; and
   a data management system communicatively coupled to the PDS system and the SDS system, wherein the data management system comprises:
   a processor configured to:
   (a) generate a validation key comprising a unique key and a first time stamp;
   (b) send a first copy of the validation key to the PDS system;
   (c) send a second copy of the validation key to the SDS system;
   (d) determine if the SDS system stores a third copy of the validation key, wherein the third copy of the validation key is received from the PDS system via the data replication system;
   (e) in response to determining that the SDS system stores the third copy of the validation key, determine a second time stamp associated with the third copy of the validation key, wherein the second time stamp corresponds to a time when the third copy of the validation key is received from the data replication system;
   (f) determine a replication lag time of the data replication system based on the first time stamp and the second time stamp;
   (g) compare the replication lag time to a replication lag time threshold value; and
   (h) in response to determining that the replication lag time is less than or equal to the replication lag time threshold value, determine a status of the replicated application data stored in the SDS system as not stale.

2. The apparatus of claim 1, wherein the processor is further configured to:
   in response to determining that the SDS system does not store the third copy of the validation key, determine the status of the replicated application data stored in the SDS system as stale.

3. The apparatus of claim 1, wherein the processor is further configured to:
   in response to determining that the replication lag time is greater than the replication lag time threshold value, determine the status of the replicated application data stored in the SDS system as stale.

4. The apparatus of claim 1, wherein the processor is further configured to:
   before determining if the SDS system stores the third copy of the validation key, wait for a time interval.

5. The apparatus of claim 1, wherein determining the replication lag time based on the first time stamp and the second time stamp comprises:
   determining a difference between a time corresponding to the second time stamp and a time corresponding to the first time stamp.

6. The apparatus of claim 1, wherein the processor is further configured to:
   store the status of the replicated application data along with a third time stamp in the SDS system, wherein the third time stamp corresponds to a start time for a process of determining if the SDS system stores the third copy of the validation key.

7. The apparatus of claim 1, wherein the processor is further configured to:
   wait for a time interval; and
   after waiting for the time interval, repeat steps (a) through (h).

8. A method comprising:
   (a) generating a validation key comprising a unique key and a first time stamp;
   (b) sending a first copy of the validation key to a primary data storage (PDS) system;
   (c) sending a second copy of the validation key to a secondary data storage (SDS) system;
   (d) determining if the SDS system stores a third copy of the validation key, wherein the third copy of the validation key is received from the PDS system via a data replication system;
   (e) in response to determining that the SDS system stores the third copy of the validation key, determining a second time stamp associated with the third copy of the validation key, wherein the second time stamp corresponds to a time when the third copy of the validation key is received from the data replication system;
   (f) determining a replication lag time of the data replication system based on the first time stamp and the second time stamp;
   (g) comparing the replication lag time to a replication lag time threshold value; and
   (h) in response to determining that the replication lag time is less than or equal to the replication lag time threshold value, determining a status of application data stored in the SDS system as not stale.

9. The method of claim 8, further comprising:
   in response to determining that the SDS system does not store the third copy of the validation key, determining the status of the application data stored in the SDS system as stale.

10. The method of claim 8, further comprising:
    in response to determining that the replication lag time is greater than the replication lag time threshold value, determining the status of the application data stored in the SDS system as stale.

11. The method of claim 8, further comprising:
    before determining if the SDS system stores the third copy of the validation key, waiting for a time interval.

12. The method of claim 8, wherein determining the replication lag time based on the first time stamp and the second time stamp comprises:
    determining a difference between a time corresponding to the second time stamp and a time corresponding to the first time stamp.

13. The method of claim 8, further comprising:
    storing the status of the application data along with a third time stamp in the SDS system, wherein the third time stamp corresponds to a start time for a process of determining if the SDS system stores the third copy of the validation key.

14. The method of claim 8, further comprising:
    waiting for a time interval; and
    after waiting for the time interval, repeating steps (a) through (h).

15. A non-transitory computer-readable medium storing instructions that, when executed by a processor, cause the processor to:
(a) generate a validation key comprising a unique key and a first time stamp;
(b) send a first copy of the validation key to a primary data storage (PDS) system;
(c) send a second copy of the validation key to a secondary data storage (SDS) system;
(d) determine if the SDS system stores a third copy of the validation key, wherein the third copy of the validation key is received from the PDS system via a data replication system;
(e) in response to determining that the SDS system stores the third copy of the validation key, determine a second time stamp associated with the third copy of the validation key, wherein the second time stamp corresponds to a time when the third copy of the validation key is received from the data replication system;
(f) determine a replication lag time of the data replication system based on the first time stamp and the second time stamp;
(g) compare the replication lag time to a replication lag time threshold value; and
(h) in response to determining that the replication lag time is less than or equal to the replication lag time threshold value, determine a status of application data stored in the SDS system as not stale.

16. The non-transitory computer-readable medium of claim 15, wherein the instructions further cause the processor to:
in response to determining that the SDS system does not store the third copy of the validation key, determine the status of the application data stored in the SDS system as stale.

17. The non-transitory computer-readable medium of claim 15, wherein the instructions further cause the processor to:
in response to determining that the replication lag time is greater than the replication lag time threshold value, determine the status of the application data stored in the SDS system as stale.

18. The non-transitory computer-readable medium of claim 15, wherein the instructions further cause the processor to:
before determining if the SDS system stores the third copy of the validation key, wait for a time interval.

19. The non-transitory computer-readable medium of claim 15, wherein determining the replication lag time based on the first time stamp and the second time stamp comprises:
determining a difference between a time corresponding to the second time stamp and a time corresponding to the first time stamp.

20. The non-transitory computer-readable medium of claim 15, wherein the instructions further cause the processor to:
wait for a time interval; and
after waiting for the time interval, repeat steps (a) through (h).

* * * * *